(12) United States Patent
Shang

(10) Patent No.: US 8,813,160 B2
(45) Date of Patent: Aug. 19, 2014

(54) METHOD, SYSTEM AND USER DEVICE FOR OBTAINING A KEY FRAME IN A STREAMING MEDIA SERVICE

(75) Inventor: Guoqiang Shang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 147 days.

(21) Appl. No.: 13/124,464

(22) PCT Filed: Aug. 25, 2009

(86) PCT No.: PCT/CN2009/073501
§ 371 (c)(1),
(2), (4) Date: Apr. 15, 2011

(87) PCT Pub. No.: WO2010/045826
PCT Pub. Date: Apr. 29, 2010

(65) Prior Publication Data
US 2011/0265130 A1    Oct. 27, 2011

(30) Foreign Application Priority Data
Oct. 23, 2008    (CN) .......................... 2008 1 0170583

(51) Int. Cl.
*H04N 7/16* (2011.01)
*H04N 7/173* (2011.01)
*H04H 20/14* (2008.01)
*H04H 60/29* (2008.01)
*H04N 21/44* (2011.01)
*H04N 21/6379* (2011.01)
*H04L 29/06* (2006.01)
*H04N 21/6437* (2011.01)
*H04N 21/442* (2011.01)
*H04N 21/658* (2011.01)
*H04N 21/6377* (2011.01)

(52) U.S. Cl.
CPC ..... *H04N 21/6377* (2013.01); *H04N 21/44008* (2013.01); *H04N 21/6379* (2013.01); *H04L 65/608* (2013.01); *H04N 21/6437* (2013.01); *H04L 65/4076* (2013.01); *H04N 21/44209* (2013.01); *H04N 21/658* (2013.01); *H04N 7/17318* (2013.01); *H04L 65/4092* (2013.01)

USPC ............. 725/121; 725/22; 725/105; 725/118; 725/131

(58) Field of Classification Search
USPC .......................................................... 725/131
See application file for complete search history.

(56) References Cited

U.S. PATENT DOCUMENTS 5,528,284 A    6/1996    Iwami et al.
6,680,976 B1 *  1/2004    Chen et al. ............... 375/240.26
(Continued)

FOREIGN PATENT DOCUMENTS

CN    1964485       5/2007
CN    101222616    7/2008
(Continued)

OTHER PUBLICATIONS

Supplementary European Search Report in European application No. 09821547.8, mailed on Jul. 20, 2012.
(Continued)

*Primary Examiner* — Justin Shepard
(74) *Attorney, Agent, or Firm* — Oppedahl Patent Law Firm LLC

(57) ABSTRACT

The invention discloses a method, system and user device for obtaining a key frame in a streaming media service. The method includes: setting a threshold time for receiving a key frame, receiving video data by a client from a streaming media server, and analyzing the video data, when the network state is normal, sending a request for adjusting a video key frame generating frequency to the streaming media server if a video key frame is not received by the client in the threshold time; when the request is received, the streaming media server determines whether to adjust the video key frame generating frequency, if so, then adjusts the video key frame generating frequency according to the request of the client. The application of the invention can improve the quality of the streaming media service, and advance the experience level of the streaming media service.

7 Claims, 2 Drawing Sheets

(56) References Cited

U.S. PATENT DOCUMENTS

| | | | |
|---|---|---|---|
| 8,238,420 B1* | 8/2012 | Shankarappa | 375/240.02 |
| 2005/0105808 A1 | 5/2005 | Labelle | |
| 2006/0048193 A1 | 3/2006 | Jacobs | |
| 2006/0206617 A1 | 9/2006 | Rey et al. | |
| 2007/0091815 A1 | 4/2007 | Tinnakornsrisuphap | |
| 2007/0157268 A1* | 7/2007 | Girish et al. | 725/90 |
| 2008/0120671 A1* | 5/2008 | Sim et al. | 725/116 |
| 2008/0263616 A1* | 10/2008 | Sallinen et al. | 725/131 |

FOREIGN PATENT DOCUMENTS

| | | |
|---|---|---|
| CN | 101383959 | 3/2009 |
| EP | 1453269 | 9/2004 |
| JP | 2007116543 | 5/2007 |
| JP | 2007124576 | 5/2007 |
| JP | 2008172629 | 7/2008 |
| WO | 2004049719 | 6/2004 |
| WO | 2006003232 | 1/2006 |

OTHER PUBLICATIONS

English Translation of the Written Opinion of the International Search Authority in international application No. PCT/CN2009/073501, mailed Nov. 12, 2009.

"Adaptive Multi-Path Video Streaming", Dec. 1, 2006, pp. 399-406, XP031 041808, ISBN: 978-0-7695-2746-8.

* cited by examiner

US 8,813,160 B2

METHOD, SYSTEM AND USER DEVICE FOR OBTAINING A KEY FRAME IN A STREAMING MEDIA SERVICE

CROSS-REFERENCE TO RELATED APPLICATIONS

This application is the U.S. National Stage of International Patent Application No. PCT/CN2009/073501 filed on Aug. 25, 2009, which claims priority to Chinese Patent Application Number 200810170583.7 filed on Oct. 23, 2008 the disclosures of which are hereby incorporated by reference in their entirety.

TECHNICAL FIELD

The invention relates to the field of communications and multimedia, in particular to a method, system and user device for obtaining a key frame in a streaming media service.

BACKGROUND

With the development of communications technologies, the communications bandwidth capable of being provided for terminal devices is increasingly large, the multimedia has a rapid development in a mobile terminal, and mobile TV, streaming media and other services become mature gradually. However, these multimedia services primarily show their own features, it is not sufficient for the development of the integration of other services into these services.

The current problem to be solved is how to make users see clear video images immediately while they watch programs so as to possibly advance the user experience in the whole service.

SUMMARY

The technical problem to be solved by the invention is to provide a method, system and user device for obtaining a key frame in a streaming media service so as to make users see clear video images immediately while they watch programs, thus possibly advancing the user experience in the whole service.

To solve the problem above, the invention provides a method for obtaining a key frame in a streaming media service, comprising:

setting a threshold time for receiving a video key frame;
a client receiving video data from a streaming media server, and analyzing the video data; when the network state is normal, sending a request for adjusting a video key frame generating frequency to the streaming media server if the video key frame is not received by the client in the threshold time; and
the streaming media server determining whether to adjust the video key frame generating frequency when the request is received, if so, then adjusting the video key frame generating frequency according to the request of the client.

The method may further comprise that: the streaming media server adjusting the video key frame generating frequency according to the request of the client comprises that the streaming media server adjusts the video key frame generating frequency according to the requests of most clients when receiving the requests from one or more clients within a same period of time during multicast or broadcast, or comprises that the streaming media server adjusts the video key frame generating frequency directly according to the request of the client during video on demand.

The method may further comprise that: the client analyzes the video data in the real time streaming protocol standard to determine whether a video key frame is received in the threshold time.

The method may further comprise that: the streaming media server adjusts the corresponding video bandwidth demand while adjusting the video key frame generating frequency.

The invention further provides a streaming media service system, comprising a client and a streaming media server, wherein
the client is used for receiving video data from the streaming media server, analyzing the video data, and, when the network state is normal, sending a request for adjusting a video key frame generating frequency to the streaming media server if a video key frame is not received in a set threshold time; and
the streaming media server is used for sending the video data to the client, determining whether to adjust the video key frame generating frequency after receiving the request of the client, if so, then adjusting the video key frame generating frequency according to the request of the client.

The streaming media service system may further comprise that: the streaming media server adjusting the video key frame generating frequency according to the request of the client comprises that the streaming media server adjusts the video key frame generating frequency according to the requests of most clients when receiving the requests from one or more clients within a same period of time during multicast or broadcast, or comprises that the streaming media server adjusts the video key frame generating frequency directly according to the request of the client during video on demand.

The streaming media service system may further comprise that: the client analyzes the video data in the real time streaming protocol standard to determine whether the video key frame is received in the threshold time.

The streaming media service system may further comprise that: the streaming media server is further used for adjusting the corresponding video bandwidth demand while adjusting the video key frame generating frequency.

The invention further provides a user device for obtaining a key frame in a streaming media service, including a video receiving module and a control module, wherein
the video receiving module is used for receiving video data and sending the video data to the control module; and
the control module is used for receiving the video data from the video receiving module, analyzing the video data, and, when the network state is normal, sending a request for adjusting a video key frame generating frequency to the streaming media server if a video key frame is not received in a set threshold time.

The user device may further comprise that: the control module analyzes the video data in the real time streaming protocol standard to determine whether the video key frame is received in the threshold time.

The invention further provides a streaming media server, which is set for sending video data to a client, receiving a request for adjusting a video key frame from the client which has analyzed the video data, determining whether to adjust the video key frame generating frequency based on the request, and adjusting the video key frame generating frequency according to the result of the determination.

The streaming media server adjusting the video key frame generating frequency according to the result of the determination may comprise that the streaming media server and adjusts the video key frame generating frequency according to the requests of most clients when receiving the requests from one or more clients within a same period of time of multicast or broadcast, or may comprise that the streaming media server adjusts the video key frame generating frequency directly according to the request of the client during video on demand.

The streaming media server may be further set for adjusting the corresponding video bandwidth demand while adjusting the video key frame generating frequency.

Compared with the prior art, the application of the invention enables a server to respond to requests of users, form a more rational key frame generating time interval after a synthetic determination, and greatly advance the user experience. The invention mainly relates to the addition of a message parameter, with fewer changes to the client and server both, no influence to the network structure, faster implementation and strong practicability.

DETAILED DESCRIPTION

The invention is further explained below with reference to the embodiments and accompanying drawings.

The main concept of the invention is that: when a network is normal, a streaming media client determines whether it has received a video key frame within a set time, if no, the streaming media client makes a request for a key frame and requests a server to adjust a video key frame generating frequency, and then, the streaming media server performs a synthetic determination after receiving the request, and adjusts the video key frame generating frequency according to the requests of most clients during multicast or broadcast or directly according to the request of the client during video on demand, and adjusts the corresponding video bandwidth demand.

According to the invention, an expansion is performed in a streaming media service system through SET_PARAMETER METHOD (a method for setting parameters) in the original real time streaming protocol (RTSP) standard, i.e. only expanding relevant fields without changing the original data structure defined by the method, so that the client and server both can identify the parameter contents in the method and the effect of user experience is thus greatly improved without need of big change to the original system.

The parameters included in the SET_PARAMETER METHOD are expanded with a parameter Key-Frame-Span which is for representing the time of request for a key frame generating frequency, and the name of the parameter can be prescribed freely, but with the content in numbers and the unit in seconds. In the actual application, the unit can also be set based on negotiation, e.g. in a send protocol, expressed as:

Key-Frame-Span: 5, which represents that a key frame is generated every 5 s on average. The server performs a synthetic determination after receiving the request from the client, and adjusts the key frame generating frequency if it accepts the parameter setting request.

Figure 1:
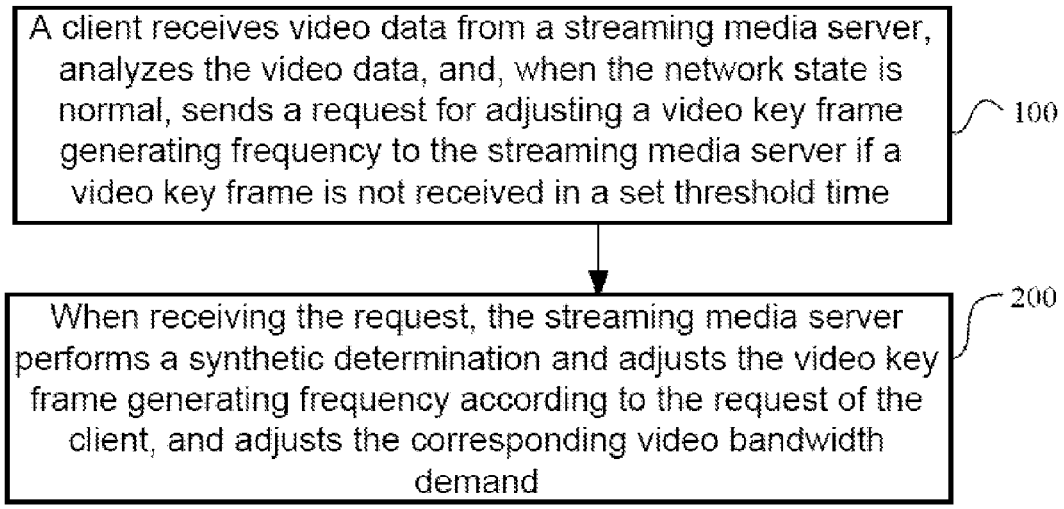
FIG. 1 is a flowchart of a method for obtaining a key frame in a streaming media service of the present invention.

As shown in FIG. 1, a method of the invention for obtaining a key frame in a streaming media service includes the following steps.

100: a client receives video data from a streaming media server, analyzes the video data, and, when the network state is normal, the client may send a request for adjusting a video key frame generating frequency to the streaming media server if a video key frame is not received in a set threshold time;

the threshold time can be set to 10 s, which is a time for determination and can be adjusted by users; and the time for request for the generating frequency is normally smaller than the threshold time.

The client analyzes the video data in the real time streaming protocol standard and determines whether the video key frame is received in the threshold time.

200: when receiving the request, the streaming media server performs a synthetic determination and adjusts the video key frame generating frequency according to the request of the client and adjusts the corresponding video bandwidth demand.

The steaming media server adjusting the video key frame generating frequency according to the request of the client includes that the streaming media server receives requests from one or more clients within a same period of time during multicast or broadcast and adjusts the video key frame generating frequency according to the requests of most clients, or the streaming media server adjusts the video key frame generating frequency directly according to the request of the client during video on demand.

If the streaming media server receives requests from many clients within the same period of time during multicast or broadcast, it may make a sequence arrangement in connection with the request time of the clients, e.g. according to the data of the minimum request time, so as to adjust the video key frame generating frequency.

According to one embodiment of the present invention, the detailed process for adjusting the key frame generating frequency through the SET_PARAMETER METHOD of RTSP is as follows:

```
client -> streaming media sever: SET_PARAMETER
rtsp://example.com/fizzle/fooRTSP/1.0
CSeq: 421
Session: efhyrio8012t
User-Agent: StreamClient/I.Ib5
Key-Frame-Span: 5
client -> streaming media sever: RTSP/1.0 200 OK
CSeq: 421
Session: efhyrio8012t
User-Agent: StreamClient/I.Ib5
Key-Frame-Span: 5
```

Figure 2:
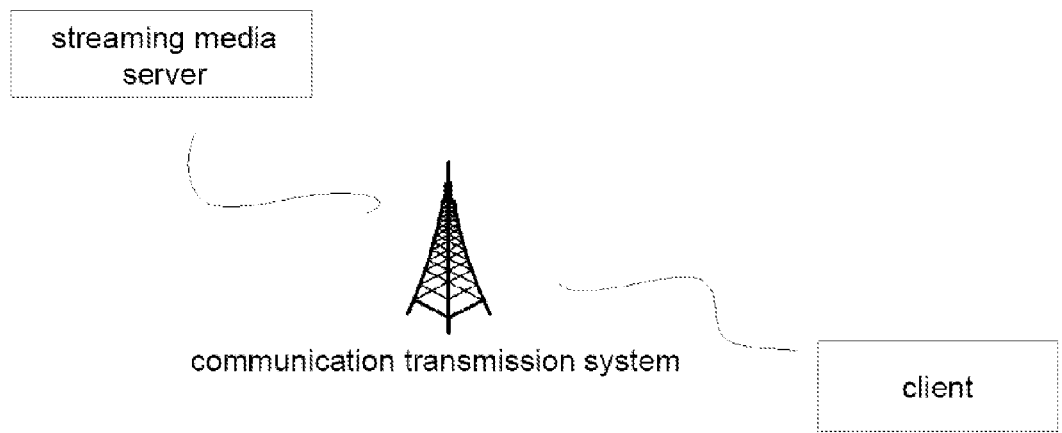
FIG. 2 is a structural diagram of a streaming media service system of the present invention.

As shown in FIG. 2, a streaming media service system of the invention includes a client and a streaming media server, wherein the client is used for receiving video data from the streaming media server, analyzing the video data, and, when the network state is normal, sending a request for adjusting a video key frame generating frequency to the streaming media server if a video key frame is not received in a set threshold time; and the streaming media server is used for sending video data to the client, performing a synthetic determination after receiving a request from the client, and adjusting the video key frame generating frequency according to the requests of most clients during multicast or broadcast or directly according to the request of the client during video on demand, and adjusting the corresponding video bandwidth demand.

A streaming media user device of the invention includes a video receiving module and a control module, wherein the video receiving module is used for receiving video data and sending the video data to the control module; and the control module is used for receiving the video data from the video receiving module, analyzing the video data, and, when the network state is normal, sending a request for adjusting a video key frame generating frequency to the streaming media server if a video key frame is not received in a set threshold time.

The invention is further explained below by an example.

Figure 3:
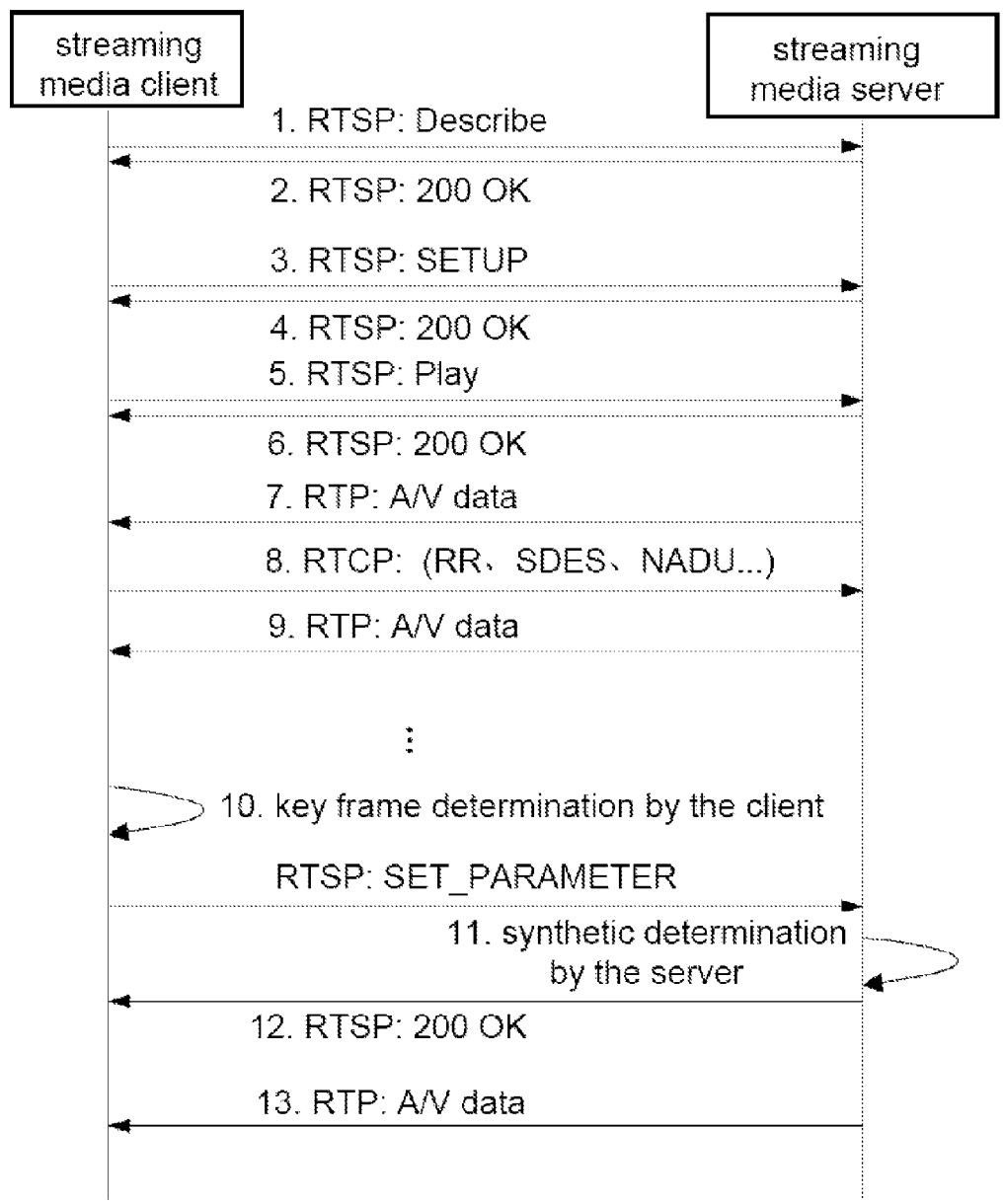
FIG. 3 is a flow diagram for the message exchange between a streaming media client and a streaming media live server.

FIG. 3 is a flow diagram illustrating the message exchange between a streaming media client and a streaming media live server, in which a basic message flow is described, meantime, to simplify the structure of the diagram, only messages exchanged between the client and the server are used, without displaying other segments, such as a portal site and a transmission system; this flow includes the following steps.

1: the streaming media client sends the streaming media server an RTSP: Describe message of a corresponding link;

2: the streaming media server sends a response OK message in which an SDP message content is included;

3: the client parses the SDP message content and sends a SETUP request message to the server;

4: the server sends an OK message in response to the client;

5: the client sends a PLAY request message to the server;

6: the server sends an OK message in response to the client;

7: the client receives an RTP message from the server, the RTP message containing audio data information;

8: the client sends an RTCP message and feeds back some network information to the server;

9: the client receives an RTP message from the server, the RTP message containing video data information;

10: the client analyzes the received video data, and, when the network state is normal and a video key frame is not received for a long time (for example, a threshold is set to 10 s, but the user does not receive a key frame within 10 s), sends a request for adjusting a key frame generating time interval to the streaming media server, such as ---
SET_PARAMETER rtsp://example.com/fizzle/foo RTSP/1.0
CSeq: 421
Session: efhyrio8012t
User-Agent: StreamClient/I.Ib5
Key-Frame-Span: 5
---

11: after receiving the request from the client, the server performs a synthetic determination according to the circumstances. For example, after receiving many requests in a same period of time during multicast or broadcast, it executes the adjustment by making a sequence arrangement in connection with the request time of the clients, e.g. according to the data of the minimum request time, or it adjusts the key frame generating frequency directly according to the request of the client during video on demand;

12: the server responds to the client; and

13: the server sends video data after adjusting a key frame sending time interval.

The above is just the preferred embodiment of the present invention, but the present invention is not limited to herein. Any variations or substitutions readily thought by those skilled in the art within the technical scope disclosed by the present invention shall fall within the protection scope of the present invention. Therefore, the protection scope of the present invention shall be determined by that of the claims.

INDUSTRIAL APPLICABILITY

With the method for obtaining a key frame in a streaming media service, the streaming media service system, the user device or the streaming media server provided by the invention, it is able to rapidly respond to users' request for adjusting a video key frame generating frequency, and form a more rational key frame generating time interval after a synthetic determination, so as to provide users with faster and smoother experience in streaming media. The invention mainly relates to the addition of a message parameter, with fewer changes to the client and server both, no influence to the network structure, faster implementation and strong practicability.

What is claimed is:

1. A method for obtaining a key frame in a streaming media service, comprising:

setting a threshold time for receiving a video key frame;

a client receiving video data from a streaming media server, and analyzing the video data; when the network state is normal, sending a request for adjusting a video key frame generating frequency to the streaming media server if the video key frame is not received by the client in the threshold time; and the streaming media server determining whether to adjust the video key frame generating frequency when the request is received, if so, adjusting the video key frame generating frequency according to the data of the minimum request time from one or more clients within a same period of time during multicast or broadcast, or adjusting the video key frame generating frequency directly according to the request of the client during video on demand;

wherein the video key frame generating frequency is a parameter representing a video key frame generating time interval;

wherein the client analyzes the video data through SET_PARAMETER METHOD in the real time streaming protocol, RTSP, standard to determine whether a video key frame is received in the threshold time;

wherein the SET_PARAMETER METHOD are expanded, only expanding relevant fields without changing the original data structure defined by the method, with a parameter Key-Frame-Span which representing the time of request for a key frame generating frequency.

2. The method according to claim 1, wherein the streaming media server adjusts the corresponding video bandwidth demand while adjusting the video key frame generating frequency.

3. A streaming media service system, comprising a client being set for receiving video data from a streaming media server, analyzing the video data, and, when the network state is normal, sending a request for adjusting a video key frame generating frequency to the streaming media server if a video key frame is not received in a set threshold time; and a streaming media server being set for sending the video data to the client, determining whether to adjust the video key frame generating frequency after receiving the request of the client, if so, adjusting the video key frame generating frequency according to the data of the minimum request time from one or more clients within a same period of time during multicast or broadcast, or adjusting the video key frame generating frequency directly according to the request of the client during video on demand;

wherein the video key frame generating frequency is a parameter representing a video key frame generating time interval;

wherein the client analyzes the video data through SET_PARAMETER METHOD in the real time streaming protocol, RTSP, standard to determine whether a video key frame is received in the threshold time;

wherein the SET_PARAMETER METHOD are expanded, only expanding relevant fields without changing the original data structure defined by the method, with a parameter Key-Frame-Span which representing the time of request for a key frame generating frequency.

4. The streaming media service system according to claim 3, wherein the streaming media server is further set for adjusting the corresponding video bandwidth demand while adjusting the video key frame generating frequency.

5. A user device, which is set for obtaining a key frame in a streaming media service, comprising a video receiving module and a control module, wherein the video receiving module is set for receiving video data and sending the video data to the control module; and the control module is set for receiving the video data from the video receiving module, analyzing the video data, and, when the network state is normal, sending a request for adjusting a video key frame generating frequency to the streaming media server if a video key frame is not received in a set threshold time, wherein the video key frame generating frequency is a parameter representing a video key frame generating time interval;

wherein the control module analyzes the video data through SET_PARAMETER METHOD in the real time streaming protocol, RTSP, standard to determine whether a video key frame is received in the threshold time;

wherein the SET_PARAMETER METHOD are expanded, only expanding relevant fields without changing the original data structure defined by the method, with a parameter Key-Frame-Span which representing the time of request for a key frame generating frequency.

6. A streaming media server, which is set for sending video data to a client, receiving a request for adjusting a video key frame from the client which has analyzed the video data, determining whether to adjust the video key frame generating frequency based on the request, and adjusting the video key frame generating frequency according to the data of the minimum request time from one or more clients within a same period of time during multicast or broadcast, or adjusting the video key frame generating frequency directly according to the request of the client during video on demand;

wherein the video key frame generating frequency is a parameter representing a video key frame generating time interval;

wherein the client analyzes the video data through SET_PARAMETER METHOD in the real time streaming protocol, RTSP, standard to determine whether a video key frame is received in the threshold time;

wherein the SET_PARAMETER METHOD are expanded, only expanding relevant fields without changing the original data structure defined by the method, with a parameter Key-Frame-Span which representing the time of request for a key frame generating frequency.

7. The streaming media server according to claim 6, which is further set for adjusting the corresponding video bandwidth demand while adjusting the video key frame generating frequency.

* * * * *